US009972295B2

(12) United States Patent
Lee

(10) Patent No.: US 9,972,295 B2
(45) Date of Patent: May 15, 2018

(54) CONTROL APPARATUS FOR GUITAR EFFECTOR LOOP USING CELLULAR PHONE

(71) Applicant: Seung Jae Lee, Seoul (KR)

(72) Inventor: Seung Jae Lee, Seoul (KR)

( * ) Notice: Subject to any disclaimer, the term of this patent is extended or adjusted under 35 U.S.C. 154(b) by 0 days. days.

(21) Appl. No.: 15/718,193

(22) Filed: Sep. 28, 2017

(65) Prior Publication Data

US 2018/0090114 A1 Mar. 29, 2018

(30) Foreign Application Priority Data

Sep. 28, 2016 (KR) ........................ 10-2016-0124686

(51) Int. Cl.
*G01P 3/00* (2006.01)
*G10H 1/02* (2006.01)
*G10H 1/34* (2006.01)
*G10H 1/00* (2006.01)

(52) U.S. Cl.
CPC ............. *G10H 1/02* (2013.01); *G10H 1/0008* (2013.01); *G10H 1/34* (2013.01); *G10H 2210/155* (2013.01); *G10H 2220/096* (2013.01)

(58) Field of Classification Search
CPC .......... G10H 1/02; G10H 1/0008; G10H 1/34; G10H 2210/155; G10H 2220/096; G10H 1/348
USPC .......................................... 84/615, 626, 746
See application file for complete search history.

(56) References Cited

U.S. PATENT DOCUMENTS 6,215,055 B1 * 4/2001 Saravis .................. G10H 1/348 84/422.1
7,525,038 B2 * 4/2009 Yamada ............... G10H 1/0091 84/622
9,263,014 B2 * 2/2016 Brandt ................. G10H 1/0091
9,595,248 B1 * 3/2017 Classe ..................... G10H 1/348
9,633,640 B1 * 4/2017 Lee ......................... G10H 1/348
9,704,462 B2 * 7/2017 Burmas ..................... G10G 7/00
9,728,172 B1 * 8/2017 Perez ........................ G10H 1/18
2009/0183625 A1 * 7/2009 Sanders ............... G10H 1/0091 84/626

(Continued)

FOREIGN PATENT DOCUMENTS

KR 10-1377246 3/2014

OTHER PUBLICATIONS

"A 3-piece set of application for iPad electric guitar effecter", Naver Blog, Aug. 17, 2014, <http://webdchobo.blog.me/220094492074>.

*Primary Examiner* — Jeffrey Donels
(74) *Attorney, Agent, or Firm* — Kile Park Reed & Houtteman PLLC

(57) ABSTRACT

Provided is an apparatus installed in a cellular phone (700) to control a guitar effector loop. The apparatus includes a patch screen display unit for displaying a patch, which is constituted by combinations of the plurality of foot switches (600) and the compactors (500) set to the respective foot switches (600), on a patch screen (710) of the cellular phone (700), a bank screen display unit for display a bank constituted by the plurality of patches on a bank screen (720) of the cellular phone (700), and a control unit performing a control so that the patch screen (710) corresponding to a selected patch is displayed by the patch screen display unit when one patch is selected from the plurality of patches displayed on the back screen (720).

4 Claims, 20 Drawing Sheets

(56) References Cited

U.S. PATENT DOCUMENTS

| | | | | |
|---|---|---|---|---|
| 2011/0271821 | A1* | 11/2011 | McKinney | G10H 1/348 84/746 |
| 2013/0327201 | A1* | 12/2013 | Urry | G10H 1/06 84/626 |
| 2014/0090546 | A1* | 4/2014 | Ceccolini | G10H 1/02 84/626 |
| 2015/0161978 | A1* | 6/2015 | Packouz | G10H 1/40 84/746 |
| 2016/0019877 | A1* | 1/2016 | Remignanti | G10H 1/0066 84/645 |
| 2016/0275928 | A1* | 9/2016 | Lee | G10H 1/0091 |
| 2016/0293151 | A1* | 10/2016 | Mayo | G10H 1/0058 |
| 2017/0025107 | A1* | 1/2017 | Packouz | G10H 1/348 |
| 2017/0025108 | A1* | 1/2017 | Packouz | G10H 1/42 |
| 2017/0316766 | A1* | 11/2017 | Perez | G10H 1/18 |

* cited by examiner

FIG. 13

| 뱅크 | A | B | C | D |
|---|---|---|---|---|
| 10 | 1,2,3 | 1,2,4 | 3,4 | 4 |
| 11 | | | | |
| ⋮ | | | | |
| 99 | | | | |

FIG. 14
700-720
Bank
1 Yesterday
2 Let it be
3 Wonderful world
4 Sweet Home Ch
5 Hotel California
6 Bohemian Rhap
7 We will rock you
8 Open Arms
9 Rosanna
10 My Sharona

CONTROL APPARATUS FOR GUITAR EFFECTOR LOOP USING CELLULAR PHONE

CROSS-REFERENCE TO RELATED APPLICATIONS

This U.S. non-provisional patent application claims priority under 35 U.S.C. § 119 of Korean Patent Application No. 10-2016-0124686, filed on Sep. 28, 2017, the entire contents of which are hereby incorporated by reference.

BACKGROUND

The present invention relates to a musical instrument, and more particularly, to an effector of a guitar.

Various kinds of effectors are used to distort a tone of an electronic guitar.

Such effectors may be classified into an analogue type and a digital type. The latter has an advantage in that use thereof is convenient but has a disadvantage in that a sound quality thereof is low. Thus, in recent years, an effector using an analogue scheme tends to be mainly used.

The effector using an analogue scheme, which refers to a compactor, includes: an input unit 3 that receives an input signal from a guitar a or another guitar effector; an output unit 4 that transmits an output signal to an amplifier b or another guitar effector; and a foot switch 5 that controls a turn-on/off state of the corresponding compactor (see FIGS. 1 to 10).

Since a player adjusts a turn-on/off state thereof during performance through the foot switch 5, the effector refers to a guitar pedal.

For example, in case of backing for expressing rock music or solo performance, effectors such as an overdrive effector and a distortion effector are required (see FIGS. 1 and 2). In case of arpeggios or strokes, to obtain a clean tone, effectors such as a reverb effector, a delay effector and a chorus effector are required (see FIGS. 3 to 5). When a special effect is required, effectors such as a phase effector, a wah effector and an octave effector are required (see FIGS. 6 to 8), and in other cases, a compressor effector, an equalizer effector, or the like may be used (see FIGS. 9 and 10).

When playing a guitar, a player generally uses a plurality of tones in the same tune, and a combination of a plurality of compactors is required to obtain the respective tones.

For this, the plurality of compactors are previously connected to each other, and each of the compactors is turned on or off by the foot switch during performance to realize various combinations, thereby obtaining a desired tone (since the player does not use his or her hands due to the guitar playing).

When some of the compactors connected to each other are turned on, and the others of the compactors are turned off, the compactors that are turned off are bypassed, and only the compactors that are turned on are combined with each other to obtain a distorted tone.

Since it is difficult to manipulate the foot switches of the plurality of compactors during the performance so as to obtain a necessary tone, a guitar effector loop (a programmable loop) 10 in which a plurality of switches 11, 12, 13, and 14 are installed to allow a user to set a separate combination of the compactors for respective switches has been developed (see FIG. 11).

Since the plurality of switches 11, 12, 13, and 14 are controlled to alternatively act, when one switch is turned on (pushed), other switches are automatically turned off.

For example, a case in which the Nos. 1, 2, and 3 effectors are set for the A switch 11, the Nos. 1, 2, and 4 effectors are set for the B switch 12, the Nos. 3 and 4 effectors are set for the C switch 13, and the No. 4 effector is set for the D switch 14, will be described as follows (see FIG. 12).

When the A switch 11 is turned on, the Nos. 1, 2, and 3 effectors are turned on, and the No. 4 effector is automatically turned off.

When the B switch 12 is turned on, the Nos. 1, 2, and 4 effectors are turned on, and the No. 3 effector is automatically turned off.

When the C switch 13 is turned on, the Nos. 3 and 4 effectors are turned on, and the Nos. 1 and 2 effectors are automatically turned off.

When the D switch 14 is turned on, the No. 4 effector is turned on, and the Nos. 1, 2, and 3 effectors are automatically turned off.

Each of the combinations of the guitar effectors (the combinations of the effectors set by the switches) is referred to as a patch, and the plurality of patches are stored and then selected to be used as needed (see FIG. 13).

The above-described related art has the following limitations.

The types of guitar effectors vary greatly as described above, and accordingly, the types of combinations of the guitar effectors also vary greatly so that the number of patches that are capable of being stored in a bank also varies greatly.

The player sets a separate combination of the effectors for each switch as a patch and stores the combination in the bank. The problem with the guitar effector loop according to the related art is that it is very inconvenient for the player to confirm and select the configuration of the patch.

That is, in the guitar effector loop according to the related art, there is a limitation that the set combination of the guitar effectors in the patch may be confirmed only by selecting one patch in the bank and pushing each switch in the selected patch.

SUMMARY

The present invention has been made to solve the above limitations, and thus, an object of the present invention is to provide an apparatus for controlling a guitar effector loop using a cellular phone, which is capable of easily confirming combinations of guitar effectors in each of patches stored in a bank and controlling the guitar effector loop.

An embodiment of the present invention provides an apparatus installed in a cellular phone (700) to control a guitar effector loop, which is connected to a guitar (a), an amplifier (b), and a plurality of compactors (500) and includes a plurality of foot switches (600) which are set to turn on/off one or more compactors (500) of the plurality of compactors (500) according to setting of a control unit of a body, wherein the plurality of foot switches (600) are installed in the body so that various combinations of the plurality of compactors (500) for the respective foot switches (600) are obtained, the apparatus including: a patch screen display unit for displaying a patch, which is constituted by combinations of the plurality of foot switches (600) and the compactors (500) set to the respective foot switches (600), on a patch screen (710) of the cellular phone (700); a bank screen display unit for display a bank constituted by the plurality of patches on a bank screen (720) of the cellular phone (700); and a control unit performing a control so that the patch screen (710) corresponding to a selected patch is displayed by the patch screen display unit when one patch is selected from the plurality of patches displayed on the back screen (720).

When one patch of the plurality of patches displayed on the bank screen (720) is selected, the control unit may perform a control so that a combination of the compactor (500) corresponding to the selected patch is set to the guitar effector loop through communication.

The plurality of foot switches (600) may be displayed on the patch screen (710) in columns, the plurality of compactors (500) may be displayed on the patch screen (710) in rows, and the compactors (500) set to the respective foot switches (600) may be displayed on cells corresponding to the columns and rows.

The plurality of patches may be displayed on the bank screen (720) by any one of a unique number and a song name or a combination thereof.

In an embodiment of the inventive concept, an apparatus installed in a cellular phone (700) to control a multi-type guitar effector, in which a plurality of guitar effector modules (100) are installed, wherein each of the guitar effector modules (100) includes a component circuit board (110) on which a circuit for an analogue type guitar effector is disposed; a module case (130) on which a variable resistor driving unit (131) for adjusting a sound by the circuit is mounted and in which the component circuit board (110) is installed; and a circuit connection unit (120) in which a circuit unit part (121), a circuit output part (122), and a circuit power supply part (123) with respect to the circuit are disposed and which is electrically connected to the component circuit board (110) and is installed outside the module case (130), includes: a body having a module mounting space (211) for mounting the plurality of guitar effector modules (100) therein; a plurality of opened parts (212) defined in a top surface of the body (210) having a shape corresponding to one or a plurality of module cases (130) so that the plurality of module cases (130) are installed; a plurality of body connection units (220) in which body input parts (221), body output parts (222), and body power supply parts (223) are disposed to be connected to the circuit input parts (121), the circuit output parts (122), and circuit power supply parts (123) of the plurality of circuit connection units (120), respectively; a body circuit board (230) which is connected to the plurality of body connection parts (220) and mounted on a body circuit mounting space (213) of the body (210) and in which a body circuit is disposed; an input terminal (201) disposed in the body (210) to receive an input signal of a guitar (a) and connected to the body circuit; an output terminal (202) disposed in the body (210) to transmit an output signal to an amplifier (b) and connected to the body circuit; and a plurality of foot switches (600) which is installed on the body (210) or a separate device connected to the body (210) so that various combinations of the guitar effector modules (110) are obtained by turning on/off one or the plurality of guitar effector modules (100) according to setting about the body circuit and which is connected to the body circuit, wherein the body circuit performs a control so that the input signal received through the input terminal (201) is distorted by sequentially passing through the plurality of component circuits to output the distorted signal through the output terminal (202), wherein the apparatus further includes: a patch screen display unit for displaying a patch, which is constituted by combinations of the plurality of foot switches (600) and the compactors (500) set to the respective foot switches (600), on a patch screen (710) of the cellular phone (700); a bank screen display unit for display a bank constituted by the plurality of patches on a bank screen (720) of the cellular phone (700); and a control unit performing a control so that the patch screen (710) corresponding to a selected patch is displayed by the patch screen display unit when one patch is selected from the plurality of patches displayed on the back screen (720).

When one patch of the plurality of patches displayed on the bank screen (720) is selected, the control unit may perform a control so that a combination of the compactor (500) corresponding to the selected patch is set to the guitar effector loop through communication.

The plurality of foot switches (600) may be displayed on the patch screen (710) in columns, the plurality of compactors (500) may be displayed on the patch screen (710) in rows, and the compactors (500) set to the respective foot switches (600) may be displayed on cells corresponding to the columns and rows.

The plurality of patches may be displayed on the bank screen (720) by any one of a unique number and a song name or a combination thereof.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings:

FIG. 13 is a view illustrating constituents of a bank of the guitar effector loop according to the related art;

An embodiment of the present invention will be described with reference to FIGS. 14 to 20.

DETAILED DESCRIPTION

Figure 1:
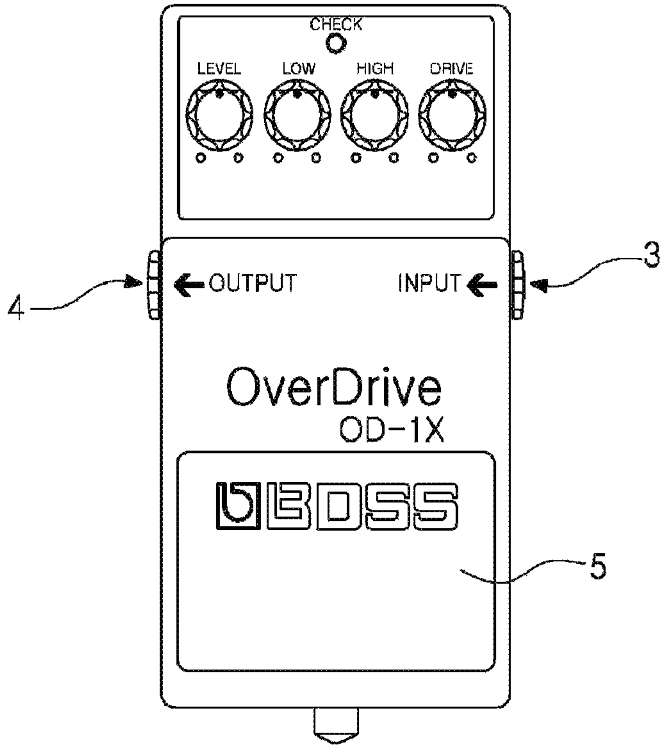
FIGS. 1 to 10 are plan views illustrating types of compactors according to the related art.
Figure 2:
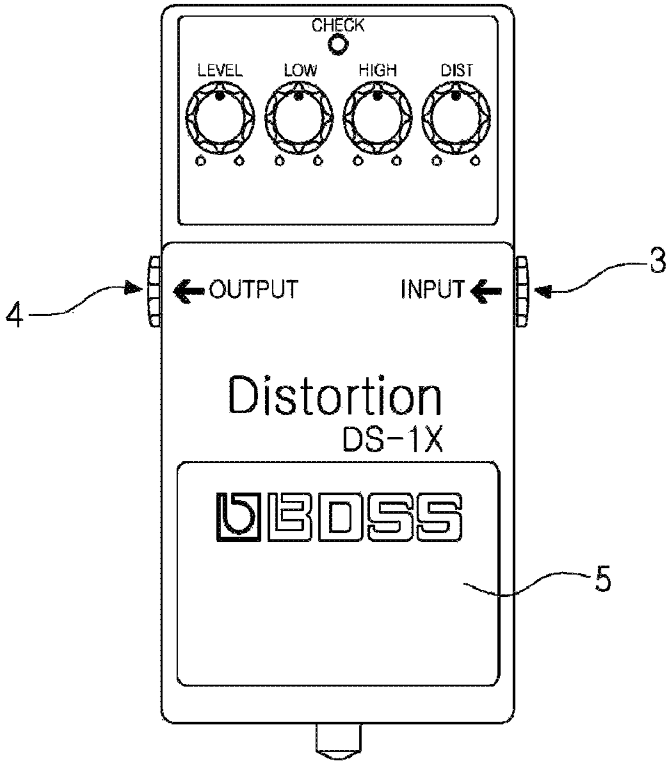
Figure 3:
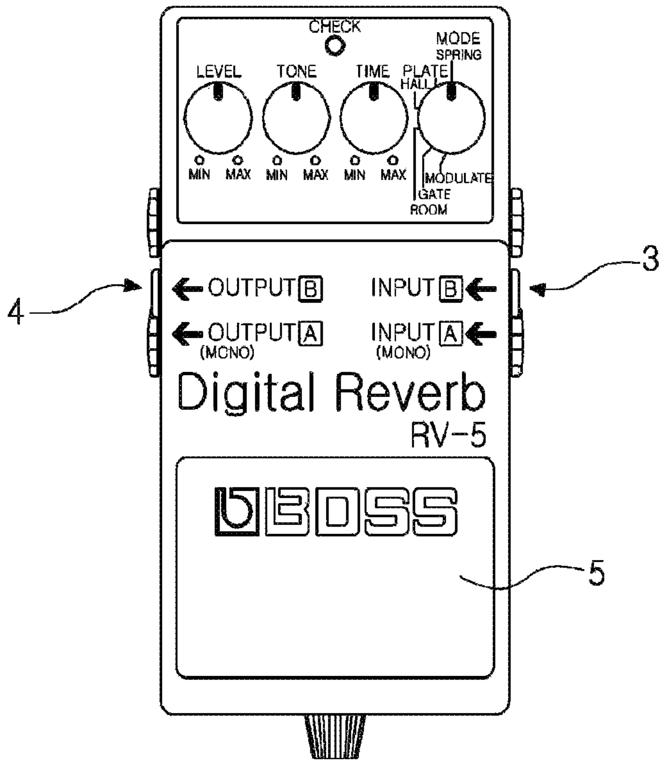
Figure 4:
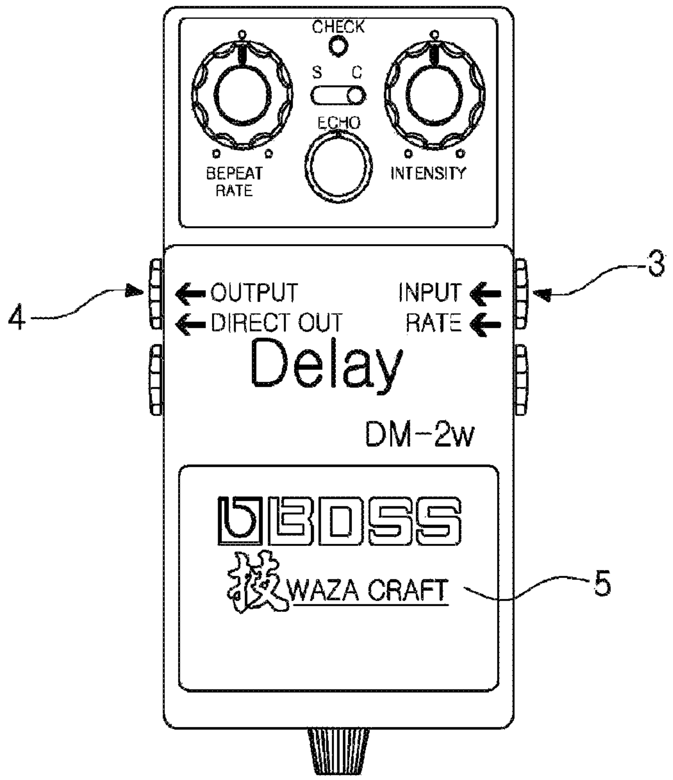
Figure 5:
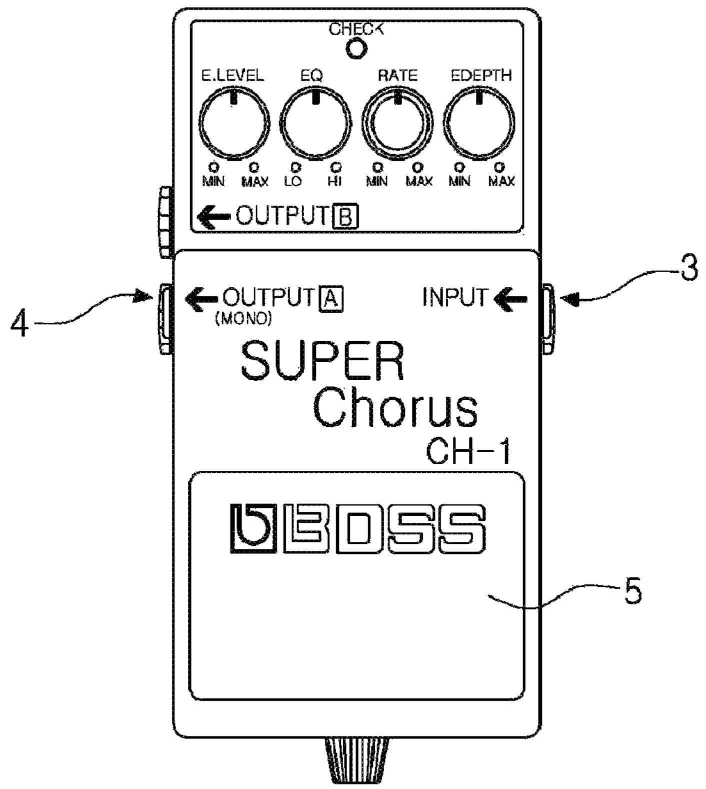
Figure 6:
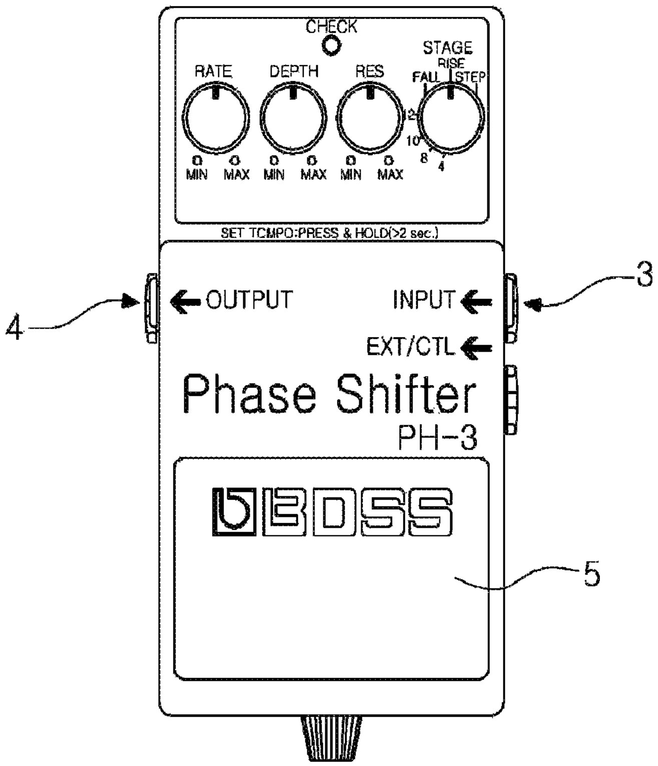
Figure 7:
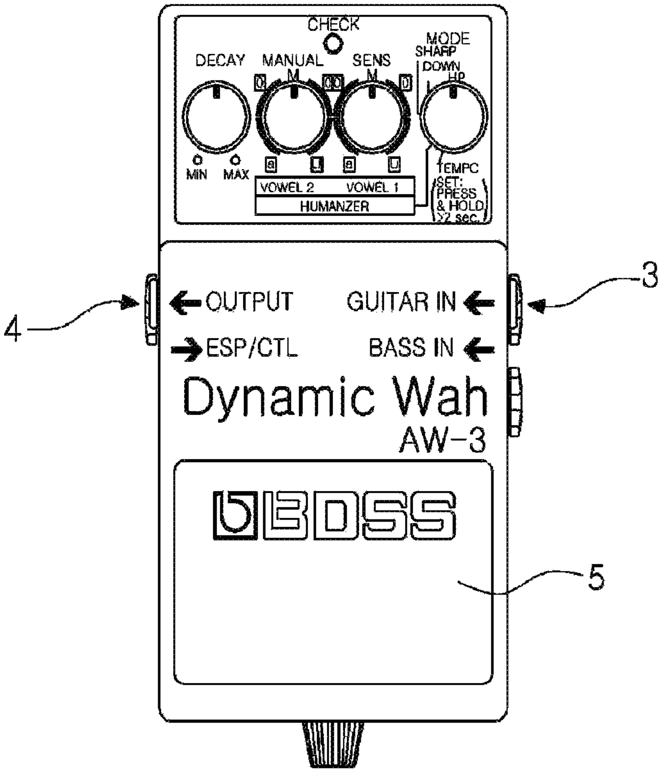
Figure 8:
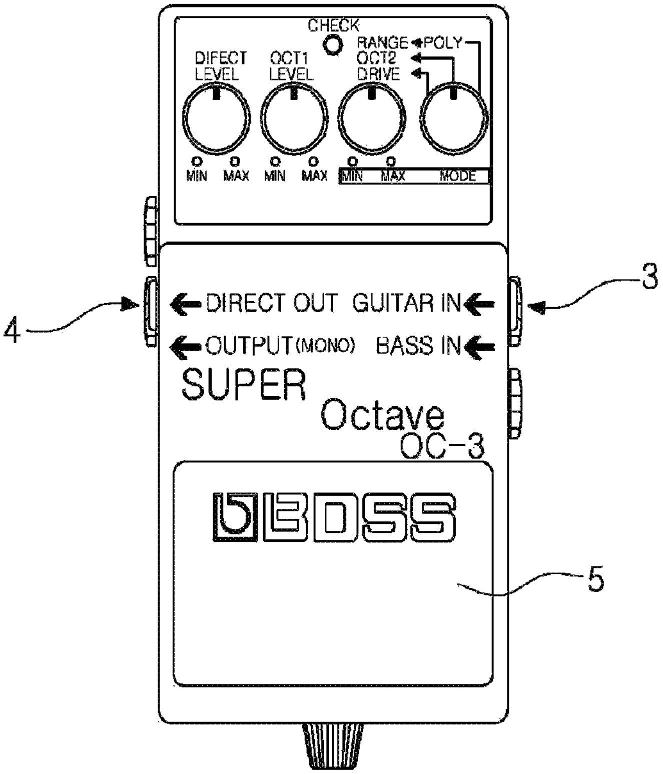
Figure 9:
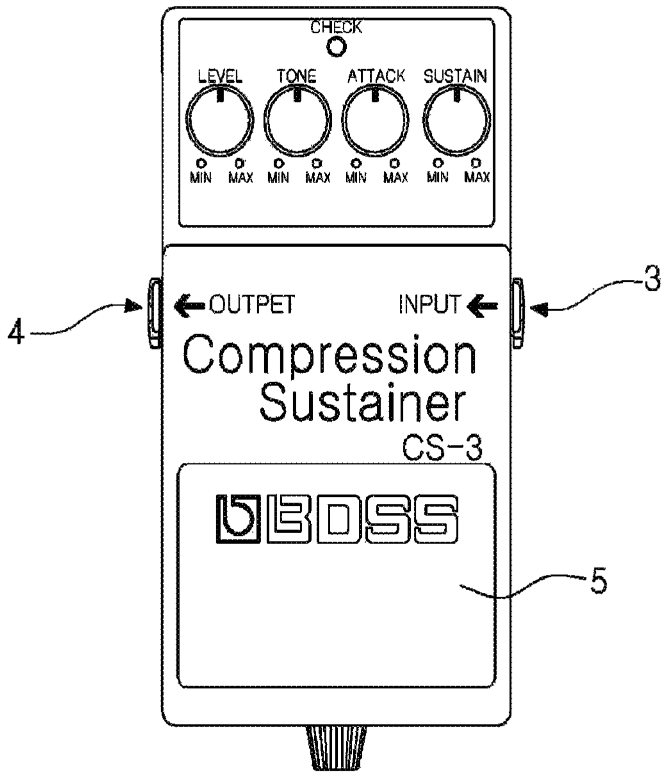
Figure 10:
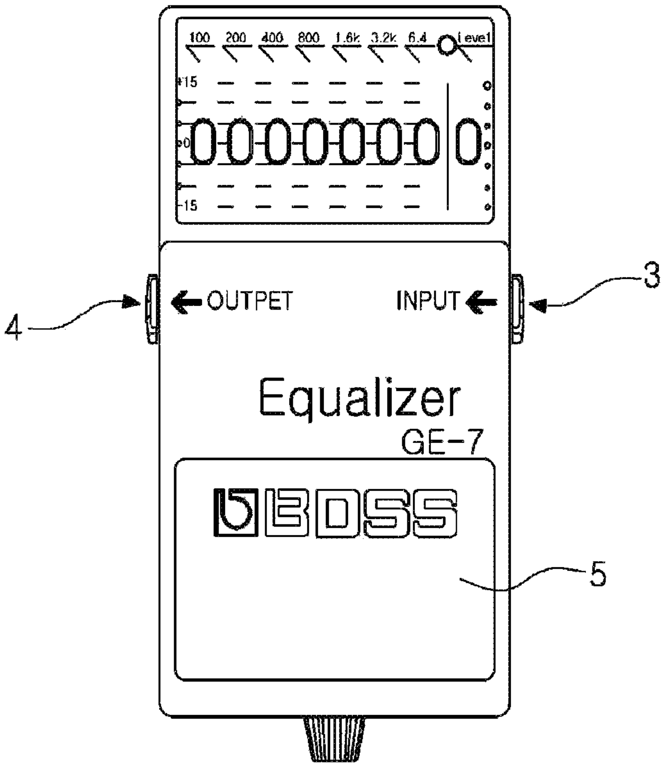
Figure 11:
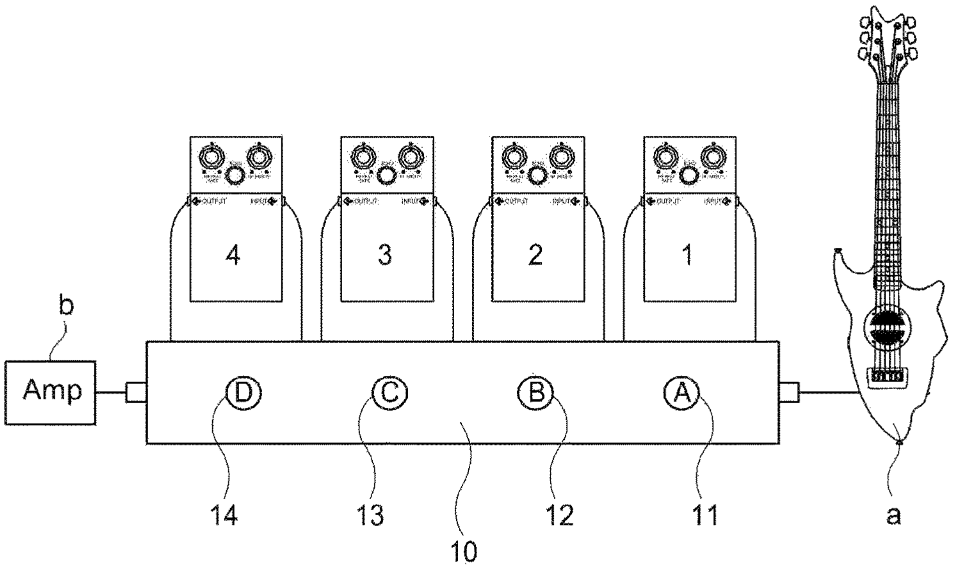
FIG. 11 is a view illustrating constituents of the guitar effector loop according to the related art.
Figure 12:
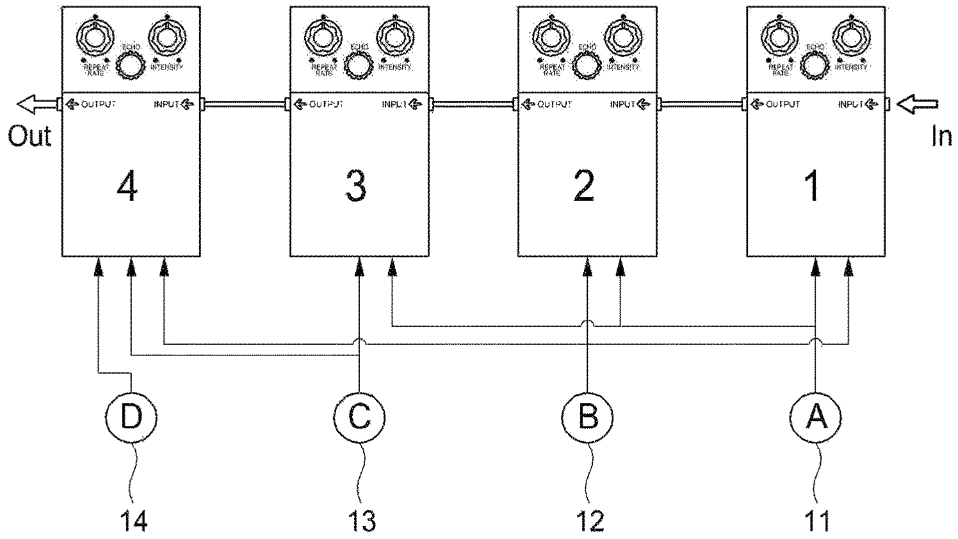
FIG. 12 is a conceptual view of the guitar effector loop according to the related art.

Hereinafter, exemplary embodiments of the present invention will be described in detail with reference to the accompanying drawings.

As illustrated in FIGS. 14 to 18, the present invention relates to an apparatus that is installed in a cellular phone to control a guitar effector loop, which fundamentally includes a plurality of foot switches 600 which are connected to a guitar a, an amplifier b, and a plurality of compactors 500 and set to turn on/off one or more compactors 500 of the plurality of compactors 500 according to setting of a control unit of a main body so that a combination of a compactor 500 of the plurality of compactors 500 for each foot switch 600 is set.

The control apparatus includes a patch screen display unit for displaying a patch, which is constituted by combinations of the plurality of foot switches 600 and the compactors 500 set to the respective foot switches 600, on a patch screen 710 of the cellular phone 700; a bank screen display unit for display a bank constituted by the plurality of patches on a bank screen 720 of the cellular phone 700; and a control unit performing a control so that the patch screen 710 corresponding to a selected patch is displayed by the patch screen display unit when one patch is selected from the plurality of patches displayed on the back screen 720.

A method of using the control apparatus according to the present invention is as follows.

A player may implement the apparatus for controlling the guitar effector loop through downloading of an application program to the cellular phone and store a plurality of patches constituted by combinations of the compactors 500 set to the foot switches 600 in the bank.

As described above, the plurality of stored patches may be confirmed through the back screen 720.

Figure 14:
FIG. 14 is a view illustrating a back screen of a cellular phone.

FIG. 14 illustrates an example of the back screen 720, in which each patch is indicated by a unique number and a song name.

A plurality of patches is displayed on the bank screen 720. If it is difficult to display all the patches on one screen, all the patches may be displayed by scrolling or a screen flipping function.

When one patch (e.g., 2. Let it be) is selected on the bank screen 720, the patch screen 710 for display a configuration of the patch that is a combination of the guitar effectors that previously set for performance of the corresponding song (the combinations of the plurality of foot switches 600 and the compactors 500 set to the respective foot switches 600) is displayed.

Figure 15:
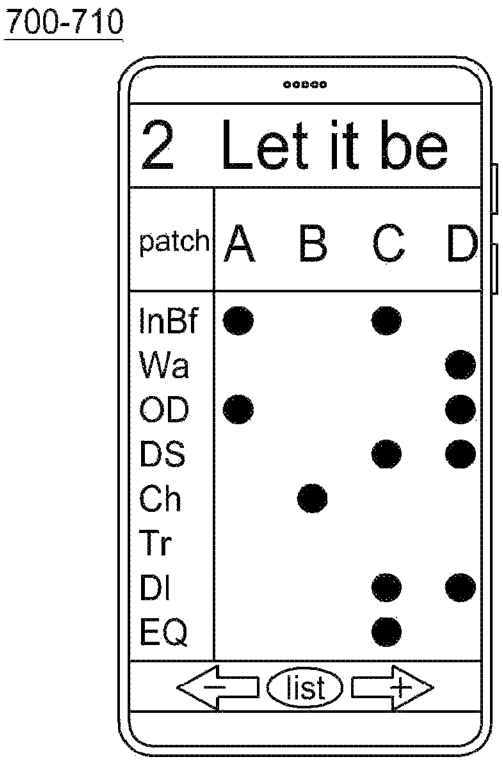
FIG. 15 is a view illustrating a patch screen of the cellular phone.

FIG. 15 illustrates an example of the patch screen 710, in which an input buffer (InBf) and an over drive (OV) that are kinds of guitar effectors (compactor) are set in a switch A of the guitar effector loop, a chorus (Ch) is set in a switch B, the input buffer (InBf), a distortion (DS), a direct interface (DI), and an equalizer (EQ) are set in a switch C, and a wah (WA), the over drive (OD), the distortion (DS), and the direct interface (DI) are set in a switch D.

If it is difficult to display the plurality of guitar effectors on one patch screen 710, all the guitar effectors may be displayed by the scrolling or the screen flipping function.

Thus, the player may select one patch (e.g., 2. Let it be) on the bank screen 720 of the cellular phone to easily confirm the configuration of the patch that is previously set by the player (the combination of the guitar effectors set for the respective switches) even through the player does not push the respective switches of the guitar effector loop one by one.

Furthermore, when one patch of the plurality of patches displayed on the bank screen 720 is selected, the control unit may perform a control so that the combination of the compactor 500 corresponding to the selected patch is set to the guitar effector loop in a wired or wireless communication manner.

That is, when the player selects one patch (e.g., 2. Let it be) on the bank screen 720, the combination of the compactor 500 corresponding to the selected patch is automatically set to the guitar effector loop.

Thus, the player may select one patch (e.g., 2. Let it be) on the bank screen 720 of the cellular phone to clearly confirm the combination (the patch) of the guitar effector that is necessary for the song to be played, and then set the combination of the guitar effector to the guitar effector loop, thereby clearly and conveniently operating the guitar effector loop.

Also, a third person other than the player may control the guitar effector loop of the player by using his or her cellular phone. This has the effect that the audience may feel different kinds of fun.

The plurality of foot switches 600 and compactors 500 are displayed on the patch screen 710 in rows and columns. Since the type of the compactor 500 is generally much larger than the number of the foot switches 600, the plurality of foot switches are displayed in columns, and the plurality of compactors are displayed in rows. Also, the compactors 500 set to the respective foot switches 600 may be displayed on cells corresponding to the lows and columns (see FIG. 15).

For convenience of the selection of the player, the plurality of patch that is capable of being selected on the bank screen 720 are displayed by any one of a unique number and a song name or a combination thereof.

Hereinafter, an embodiment in which the control apparatus according to the present invention is applied to the multi-type guitar effector will be described with reference to FIGS. 19 to 20.

Here, a multi-type guitar effector has a fundamental feature in which a plurality of guitar effector modules 100 are detachably installed in a body 210, wherein different kinds of plurality of guitar effector modules 100 (corresponding to the compactors according to the foregoing embodiments) are installed, and the above-described guitar effector loop function is given.

Figure 16:
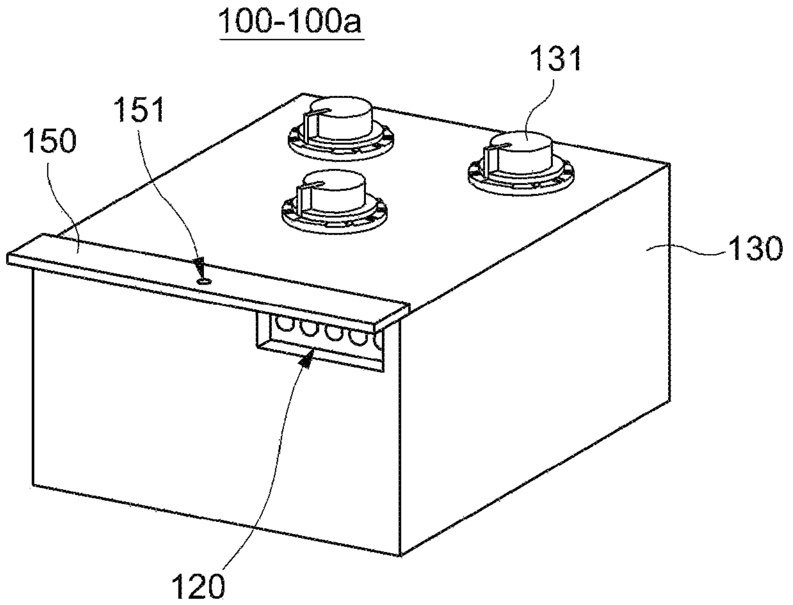
FIG. 16 is a perspective view of a guitar effector module.

Each of the guitar effector modules 100 includes: a component circuit board 110 on which a circuit for an analogue type guitar effector is disposed; a module case 130 on which a variable resistor driving unit 131 for adjusting a sound by the circuit is mounted and in which the component circuit board 110 is installed; and a circuit connection unit 120 in which a circuit unit part 121, a circuit output part 122, and a circuit power supply part 123 with respect to the circuit are disposed and which is electrically connected to the component circuit board 110 and is installed outside the module case 130 (see FIG. 16).

Figure 17:
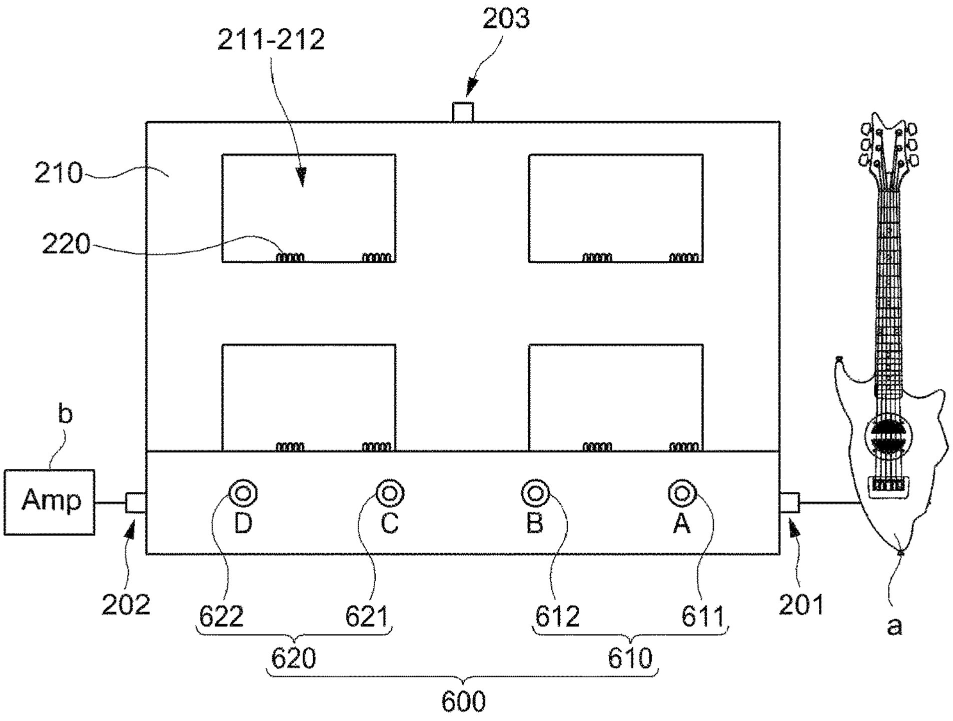
FIG. 17 is a plan view illustrating a first usage state of a multi-type guitar effector.
Figure 18:
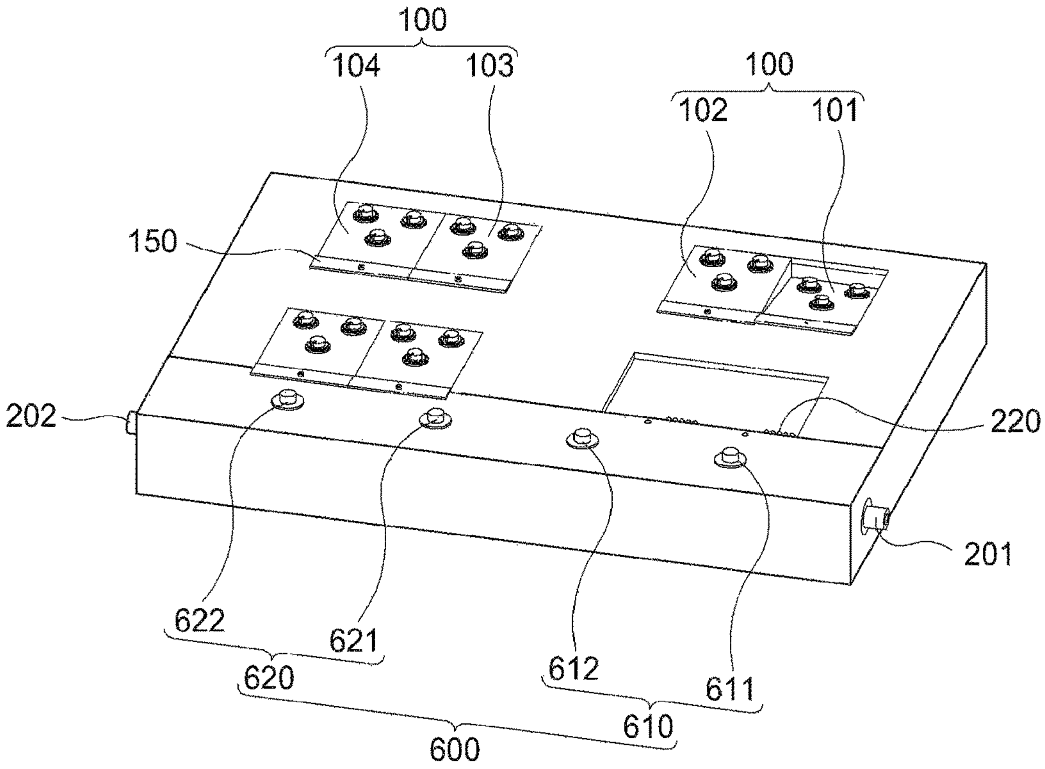
FIG. 18 is a perspective view illustrating a second use state of the multi-type guitar effector.

The multi-type guitar effector on which the plurality of guitar effector modules 100 are mounted includes: the body having a module mounting space 211 for mounting the plurality of guitar effector modules 100 therein; a plurality of opened parts 212 defined in a top surface of the body 210 having a shape corresponding to one or a plurality of module cases 130 so that the plurality of module cases 130 are installed; a plurality of body connection units 220 in which body input parts 221, body output parts 222, and body power supply parts 223 are disposed to be connected to the circuit input parts 121, the circuit output parts 122, and the circuit power supply parts 123 of the plurality of circuit connection units 120, respectively; a body circuit board 230 which is connected to the plurality of body connection parts 220 and mounted on a body circuit mounting space 213 of the body 210 and in which a body circuit is disposed; an input terminal 201 disposed in the body 210 to receive an input signal of a guitar a and connected to the body circuit; an output terminal 202 disposed in the body 210 to transmit an output signal to an amplifier b and connected to the body circuit; and a plurality of foot switches 600 which is installed on the body 210 or a separate device connected to the body 210 so that various combinations of the guitar effector modules 110 are obtained by turning on/off one or the plurality of guitar effector modules 100 according to setting about the body circuit and which is connected to the body circuit (see FIGS. 17 and 18).

Here, the body circuit performs a control so that the input signal received through the input terminal 201 is distorted by sequentially passing through the plurality of component circuits to output the distorted signal through the output terminal 202.

The multi-type guitar effector according to the present invention is not configured by the plurality of compactors which are separate complete products and a multi-type apparatus (loop) as in the related art, but a complete product thereof is finally obtained by coupling the plurality of guitar effector modules 100 to the body 210 of the multi-type guitar effector.

"A separate device connected to the body 210", on which the plurality of switches 600 are installed may represent a case in which the body 210 is not placed on the floor so as to come into contact with the player's feet and a case in which a separate device on which the switch 240 is installed is placed on the floor and connected to the body 210 through in a wire or wireless manner.

When this configuration is selected, a combination structure in which a plurality of circuits for the guitar effectors are mutually coupled to each other may be achieved only by mounting the guitar effector modules 100 on the body 210 and connecting the circuit connection units 120 thereof to the body connection units 220 of the body 210. Thus, use of a plurality of cables as in the related art may be omitted, so that transport, storage, installation and use thereof are simple and convenient.

As described above, the apparatus for controlling the guitar effector loop using the cellular phone may be applied to the multi-type guitar effector as it is.

That is, the apparatus for controlling the multi-type effector according to the present invention includes: a patch screen display unit for displaying a patch, which is constituted by combinations of the plurality of foot switches 600 and the compactors 500 set to the respective foot switches 600, on a patch screen 710 of the cellular phone 700; a bank screen display unit for display a bank constituted by the plurality of patches on a bank screen 720 of the cellular phone 700; and a control unit performing a control so that the patch screen 710 corresponding to a selected patch is displayed by the patch screen display unit when one patch is selected from the plurality of patches displayed on the back screen 720.

A method of using the case in which the control apparatus according to the present invention is applied to the multi-type guitar effector is as follows.

The player may mount the plurality of guitar effector modules 100 to be used on the multi-type guitar effector body 210 and store the plurality of patches constituted by the combinations of the guitar effector modules 100 set to the respective foot switches 600 in the bank of the multi-type guitar effector body 210.

The player implements the apparatus for controlling the guitar effector loop through downloading of an application program to the cellular phone and store the plurality of patches in the bank of the cellular phone.

The plurality of stored patches may be confirmed through the bank screen 720.

FIG. 14 illustrates an example of the back screen 720, in which each patch is indicated by a unique number and a song name.

When one patch 2 (e.g., Let it be) is selected on the bank screen 720, the patch screen 710 for display a configuration of the patch that is a combination of the guitar effectors that previously set for performance of the corresponding song (the combinations of the plurality of foot switches 600 and the guitar effector modules 100 set to the respective foot switches 600) is displayed.

FIG. 15 illustrates an example of the patch screen 710, in which an input buffer (InBf) and an over drive (OV) that are kinds of guitar effector modules are set in a switch A of the multi-type guitar effector, a chorus (Ch) is set in a switch B, the input buffer (InBf), a distortion (DS), a direct interface (DI), and an equalizer (EQ) are set in a switch C, and a wah (WA), the over drive (OD), the distortion (DS), and the direct interface (DI) are set in a switch D.

Thus, the player may select one patch (e.g., 2. Let it be) on the bank screen 720 of the cellular phone to easily confirm the configuration of the patch that is previously set by the player (the combination of the guitar effectors set for the respective switches) even through the player does not push the respective switches of the guitar effector loop one by one.

Furthermore, when one patch of the plurality of patches displayed on the bank screen 720 is selected, the control unit may perform a control so that the combination of the guitar effector module 100 corresponding to the selected patch is set to the multi-type guitar effector in a wired or wireless communication manner.

That is, when the player selects one patch (e.g., 2. Let it be) on the bank screen 720, the combination of the guitar effector module 100 corresponding to the selected patch is automatically set to the multi-type guitar effector.

Thus, the player may select one patch (e.g., 2. Let it be) on the bank screen 720 of the cellular phone to clearly confirm the combination (the patch) of the guitar effector module 100 that is necessary for the song to be played, and then set the combination of the guitar effector to the multi-type guitar effector, thereby clearly and conveniently operating the multi-type guitar effector.

Also, a third person other than the player may control the multi-type guitar effector of the player by using his or her cellular phone. This has the effect that the audience may feel different kinds of fun.

The plurality of foot switches 600 and the guitar effector modules 100 are displayed on the patch screen 710 in rows and columns. Since the type of the guitar effector modules 100 is generally much larger than the number of the foot switches 600, the plurality of foot switches are displayed in rows, and the plurality of guitar effector modules 100 are displayed in columns. Also, the guitar effector modules 100 set to the respective foot switches 600 may be displayed on cells corresponding to the lows and columns (see FIG. 15).

For convenience of the selection of the player, the plurality of patch that is capable of being selected on the bank screen 720 are displayed by any one of a unique number and a song name or a combination thereof.

Embodiments and effects with respect to the plurality of switches 600 may be fundamentally the same as those of the above-described guitar effector loop, and thus, specific constituents and effects of the multi-type guitar effector will be described below.

The body circuit performs a control such that the input signal received through the input terminal 201 is transferred to the circuit input parts 121 of the plurality of circuit connection units 120 through the body output parts 222 of the plurality of body connection units 220, and the signal distorted by the plurality of component circuits is transferred to the body input parts 221 of the plurality of body connection units 220 through the circuit output parts 122 of the plurality of circuit connection units 120 and then is output through the output terminal 202.

Since it is preferred that a signal ground (signal GND) is separately connected to remove noise, signal GND connection parts 124 of the circuit connection units 120 are separately connected to signal GND connection parts 224 of the body connection parts 220.

For example, the input signal received through the input terminal 201 is transferred to the circuit input part 121 of the circuit connection unit 120 of a No. 1 guitar effector module 100 through the body output part 222 of the No. 1 body connection unit 220 of the body 210, and the signal distorted by the circuit of the No. 1 guitar effector module 100 is transferred to the body input part 221 of the No. 1 body connection unit 220 through the circuit output part 122 of the circuit connection unit 120, and then is transferred to the body circuit again.

The signal of the body circuit is transferred to the circuit input part 121 of the circuit connection unit 120 of a No. 2 guitar effector module 100 through the body output part 222 of the No. 2 body connection unit 220 of the body 210, and the signal distorted by the circuit of the No. 2 guitar effector module 100 is transferred to the body input part 221 of the No. 2 body connection unit 220 through the circuit output part 122 of the circuit connection unit 120, and then is transferred to the body circuit again.

The signal distorted by the circuit of the final guitar effector module 100 through this process is transferred to the body input part 221 of the final body connection unit 220 through the circuit output part 122 of the circuit connection unit 120 of the final guitar effector module 100 and then is output through the output terminal 202.

The variable resistor driving unit 131 for adjusting a level, a tone, and the like may be mounted on the module case 130, and the module case 130 is coupled to the opened part 212 of the body. Therefore, the effector circuit of the corresponding component assembly may be adjusted by the above-described variable resistor driving part 131.

A catching part 150 that protrudes outward from an upper portion of the module case 130 and is stepped upward is disposed on the module case 130. While a top surface of the guitar effector module 100 having such a structure is exposed to the above opened part 212 through a lower opened portion of the body 210, when the catching part 150 is caught by an edge of the opened part 212 of the body 210, and the lower opened portion of the body 210 is coupled (screw-coupled or the like) through a separate closed plate 250, simple, convenient, and stable coupling may be achieved (see FIG. 20).

When a coupling hole 151 is defined in the catching part 150, and a screw member or the like is coupled to the body 210 through the coupling hole 151, more stable coupling may be achieved.

The opened part 212 of the body 210 has a shape corresponding to one or the plurality of module cases 130. When the opened part 212 has the shape corresponding to the plurality of module cases 130, a plurality of small guitar effector modules 100*a* may be installed in one opened part 212 (see FIG. 17).

It is preferred for stable mounting of the guitar effector modules 100 that the body connection units 220 of the body 210 of the multi-type guitar effector protrude from lower sides of the opened parts 212, and the circuit connection units 120 of the guitar effector modules 100 are recessed to correspond thereto (see FIGS. 17 and 18).

The circuit input part 121 for transferring an input signal to the circuit, the circuit output part 122 for outputting an output signal distorted by the circuit, and the circuit power supply part 123 for supplying power to the circuit are disposed in the circuit connection unit 120 of the guitar effector module 100.

Figure 19:
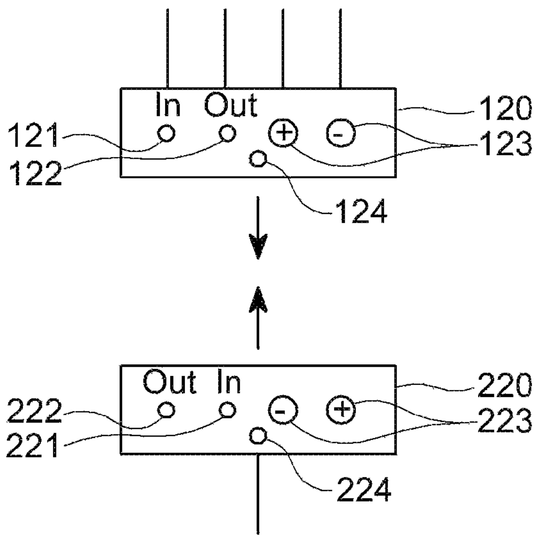
FIG. 19 is an exploded perspective view of the multi-type guitar effector.
Figure 20:
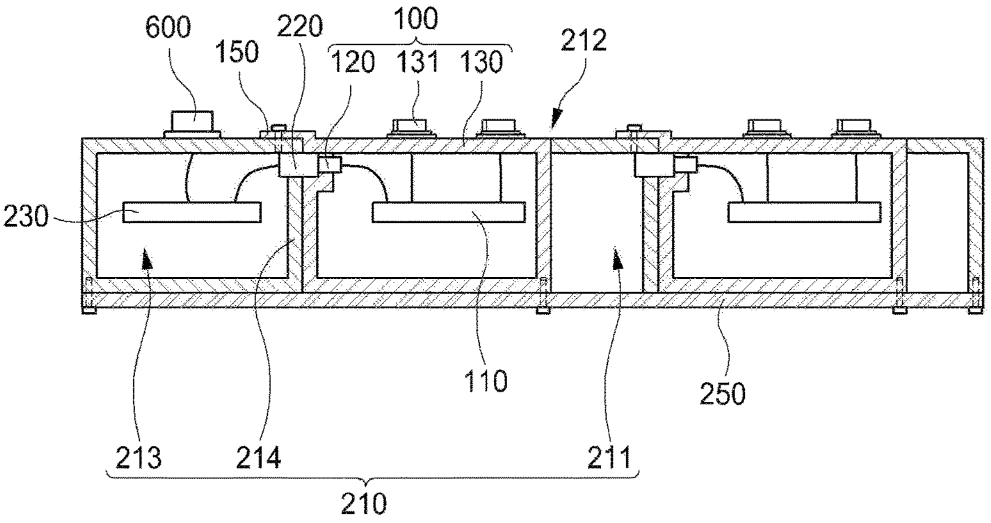
FIG. 20 is a cross-sectional view of the multi-type guitar effector.

The body input part 221 for receiving the output signal from the circuit output part 122, the body output part 222 for transmitting a signal of the body circuit to the circuit input part 121 of the guitar effector module 100, and the body power supply part 223 for supplying power to the circuit power supply part 123 are disposed in the body connection unit 220 that is connected to the circuit connection unit 120 (see FIG. 19).

The circuit connection unit 120 of the guitar effector module 100 and the body connection part 220 of the body 210 may be fitted in each other by uneven structures. When a coupling structure in which the top surface of the guitar effector module 100 is exposed through the opened part 212 as described above is selected, a groove structure is selected as the circuit connection unit 120 of the guitar effector module 100, and a protruding structure is selected as the body connection unit 220 of the body 210, so that the coupling between the body 210 and the guitar effector module 100 and the coupling between the circuit connection unit 120 and the body connection unit 220 may be naturally achieved together.

The body 210 is spatially partitioned by a partition wall 214. The body circuit board 230 is mounted in the body circuit mounting space 213 of the partitioned spaces, and the guitar effector module 100 is mounted in the module mounting space 211 on an opposite side thereto.

The body connection unit 220 connected to the body circuit board 230 is exposed close to the module mounting space 211 over the partition wall 214, and the plurality of guitar effector modules 100 are coupled to each other in such a module mounting space 211.

Thus, a user may obtain a multi-type guitar effector having a desired combination only by coupling the plurality of guitar effector modules 100 to the body 210 in a desired pattern, and accordingly, the coupling the circuit connection unit 120 and the body connection unit 220 in the module mounting space 211.

The input terminal 201 that is connected to the body circuit to receive the input signal from the guitar a and the output terminal 202 that is connected to the body circuit to transmit the output signal to the amplifier b are disposed at one side or opposite sides of the body 210, and the plurality of switches 240 that are connected to the body circuit to turn on/off the component circuit board 110 are installed to be exposed to the top surface of the body 210.

Here, the switch 600 may have the same function as the switch 600 of the above-described effector loop.

The power supply terminal 203 is installed in the body 210. Power supplied to the power supply terminal 203 is supplied to the plurality of component circuit boards 110 through the body power supply parts 223 of the plurality of body connection units 220 and the circuit power supply parts 123 of the plurality of circuit connection parts 120.

As described above, the body circuit serves to output a signal that is input through one of the plurality of body connection parts 220, through a subsequent body connection unit 220, and output a signal that is distorted by repeating this process to the output terminal.

The present invention may provide the guitar effector loop that is capable of increasing the number of combinations of the guitar effectors without increasing the number of switches and the multi-type guitar effector using the same.

The present invention may provide the apparatus for controlling the guitar effector loop using the cellular phone, which is capable of easily confirming the combinations of the guitar effectors in each of the patches stored in the bank and controlling the guitar effector loop.

Although the above description merely corresponds to some exemplary embodiments that may be implemented by the present invention, as well known, the scope of the present invention should not be interpreted as being limited to the above-described embodiments, and all technical spirits having the same basis as that of the above-described technical spirit of the present invention are included in the scope of the present invention.

Although the above description merely corresponds to some exemplary embodiments that may be implemented by the present invention, as well known, the scope of the present invention should not be interpreted as being limited to the above-described embodiments, and all technical spirits having the same basis as that of the above-described technical spirit of the present invention are included in the scope of the present invention.

What is claimed is:

1. An apparatus installed in a cellular phone (700) to control a multi-type guitar effector, in which a plurality of guitar effector modules (100) are installed, wherein each of the guitar effector modules (100) comprises a component circuit board (110) on which a circuit for an analogue type guitar effector is disposed; a module case (130) on which a variable resistor driving unit (131) for adjusting a sound by the circuit is mounted and in which the component circuit board (110) is installed; and a circuit connection unit (120) in which a circuit unit part (121), a circuit output part (122), and a circuit power supply part (123) with respect to the circuit are disposed and which is electrically connected to the component circuit board (110) and is installed outside the module case (130), the apparatus comprising:

a body having a module mounting space (211) for mounting the plurality of guitar effector modules (100) therein;

a plurality of opened parts (212) defined in a top surface of the body (210) having a shape corresponding to one or a plurality of module cases (130) so that the plurality of module cases (130) are installed;

a plurality of body connection units (220) in which body input parts (221), body output parts (222), and body power supply parts (223) are disposed to be connected to the circuit input parts (121), the circuit output parts (122), and circuit power supply parts (123) of the plurality of circuit connection units (120), respectively;

a body circuit board (230) which is connected to the plurality of body connection parts (220) and mounted on a body circuit mounting space (213) of the body (210) and in which a body circuit is disposed;

an input terminal (201) disposed in the body (210) to receive an input signal of a guitar (a) and connected to the body circuit;

an output terminal (202) disposed in the body (210) to transmit an output signal to an amplifier (b) and connected to the body circuit; and a plurality of foot switches (600) which is installed on the body (210) or a separate device connected to the body (210) so that various combinations of the guitar effector modules (110) are obtained by turning on/off one or the plurality of guitar effector modules (100) according to setting about the body circuit and which is connected to the body circuit, wherein the body circuit performs a control so that the input signal received through the input terminal (201) is distorted by sequentially passing through the plurality of component circuits to output the distorted signal through the output terminal (202), wherein the apparatus further comprises:

a patch screen display unit for displaying a patch, which is constituted by combinations of the plurality of foot switches (600) and the compactors (500) set to the respective foot switches (600), on a patch screen (710) of the cellular phone (700);

a bank screen display unit for display a bank constituted by the plurality of patches on a bank screen (720) of the cellular phone (700); and a control unit performing a control so that the patch screen (710) corresponding to a selected patch is displayed by the patch screen display unit when one patch is selected from the plurality of patches displayed on the back screen (720).

2. The apparatus of claim 1, wherein, when one patch of the plurality of patches displayed on the bank screen (720) is selected, the control unit performs a control so that a combination of the compactor (500) corresponding to the selected patch is set to the guitar effector loop through communication.

3. The apparatus of claim 1, wherein the plurality of foot switches (600) are displayed on the patch screen (710) in columns, the plurality of compactors (500) are displayed on the patch screen (710) in rows, and the compactors (500) set to the respective foot switches (600) are displayed on cells corresponding to the columns and rows.

4. The apparatus of claim 1, wherein the plurality of patches are displayed on the bank screen (720) by any one of a unique number and a song name or a combination thereof.

* * * * *